(12) United States Patent
Werneth et al.

(10) Patent No.: US 11,988,782 B2
(45) Date of Patent: May 21, 2024

(54) CLEANING DEVICE FOR A LIDAR SENSOR OF A WORKING DEVICE, INCLUDING A VEHICLE

(71) Applicant: Robert Bosch GmbH, Stuttgart (DE)

(72) Inventors: Jens Werneth, Stuttgart (DE); Johannes Richter, Ludwigsburg (DE); Marco Naegele, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/647,071

(22) Filed: Jan. 5, 2022

(65) Prior Publication Data

US 2022/0221564 A1 Jul. 14, 2022

(30) Foreign Application Priority Data

Jan. 8, 2021 (DE) ...................... 10 2021 200 098.3

(51) Int. Cl.
*G01S 7/497* (2006.01)
*B60S 1/04* (2006.01)
(Continued)

(52) U.S. Cl.
CPC ............ *G01S 7/497* (2013.01); *B60S 1/0491* (2013.01); *B60S 1/566* (2013.01); *G01S 7/481* (2013.01); *G01S 7/4813* (2013.01); *B08B 1/143* (2024.01); *B60S 1/3404* (2013.01); *G01S 2007/4975* (2013.01); *G01S 2007/4977* (2013.01)

(58) Field of Classification Search
CPC ........ B60S 1/566; B60S 1/0848; B60S 1/485; B60S 1/0818; B60S 1/0844; B60S 1/3404; B60S 1/0491; B60S 1/04; B60S 1/023; B60S 1/026; B60S 1/542; B60S 1/52; B60S 1/56; B60S 1/54; G01S 7/497; G01S 7/4813; G01S 2007/4977; G01S 2007/4975; G01S 7/481; B08B 1/006; B08B 3/024
See application file for complete search history.

(56) References Cited

U.S. PATENT DOCUMENTS 4,131,834 A * 12/1978 Blaszkowski ........... B60S 1/485
318/483
11,457,204 B1 * 9/2022 Frevert .................. G01N 21/94
(Continued)

FOREIGN PATENT DOCUMENTS

DE 2818019 C2 7/1980
DE 19539422 A1 4/1997
(Continued)

*Primary Examiner* — Jennifer D Bennett
*Assistant Examiner* — Erin R Garber
(74) *Attorney, Agent, or Firm* — NORTON ROSE FULBRIGHT US LLP; Gerard A. Messina

(57) ABSTRACT

A cleaning device for a lidar sensor set-up. The cleaning device includes a movable cleaning element, and is configured, for a cleaning operation, to move the cleaning element over a window of the lidar sensor set-up, on a side facing away from the lidar sensor device and facing the field of view of the lidar sensor set-up. The movable cleaning element has an optical element. The optical element is configured to send back and, in particular, reflect back primary light from a transmitting path of the lidar sensor set-up, which is incident upon the optical element, into a receiving path of the lidar sensor set-up.

7 Claims, 8 Drawing Sheets

(51) Int. Cl.
*B60S 1/56* (2006.01)
*G01S 7/481* (2006.01)
*B08B 1/14* (2024.01)
*B60S 1/34* (2006.01)

(56) References Cited

U.S. PATENT DOCUMENTS

| | | | |
|---|---|---|---|
| 2008/0210881 A1* | 9/2008 | Harris | G01S 17/95 250/395 |
| 2021/0116544 A1* | 4/2021 | Yamamoto | G01S 7/497 |
| 2022/0107393 A1* | 4/2022 | Tsutsumitake | G01S 7/4811 |

FOREIGN PATENT DOCUMENTS

| | | |
|---|---|---|
| DE | 10000290 A1 | 7/2001 |
| DE | 102017126770 A1 | 5/2018 |
| DE | 102017221522 A1 | 6/2019 |
| DE | 102017221530 A1 | 6/2019 |
| DE | 102018218255 A1 | 4/2020 |
| WO | 2020064885 A1 | 4/2020 |

* cited by examiner

CLEANING DEVICE FOR A LIDAR SENSOR OF A WORKING DEVICE, INCLUDING A VEHICLE

CROSS REFERENCE

The present application claims the benefit under 35 U.S.C. § 119 of German Patent Application No. DE 10 2021 200 098.3 filed on Jan. 8, 2021, which is expressly incorporated herein by reference in its entirety.

FIELD

The present invention relates to a cleaning device for a lidar sensor set-up, a lidar sensor set-up as such, as well as a working device.

BACKGROUND INFORMATION

In working devices and, in particular, in vehicles, lidar sensors are increasingly being used to monitor surroundings. The quality of the monitoring of the surroundings is substantially a function of the quality of the view of the sensor onto the field of view. Upon the installation of a sensor in the outer region of a working mechanism and, in particular, a vehicle, the sensor, along with its window, is subjected to environmental influences, thus, in particular, precipitation, as well, such as rain, dew, frost, snow and ice, but also traces of contamination by dust, insects and the like. Because of this, the clear view of the sensor through the window, through which primary light of the sensor is emitted out into the field of view and secondary light, in particular, from the field of view, is received, may be and become permanently impaired, either due to stubborn dirt, due to damage, and/or due to continuous deterioration of the optical characteristics of the window of the sensor.

SUMMARY

The cleaning device of the present invention, for a lidar sensor device, may have the advantage that, using simple devices, a deterioration in the optical characteristics of a window of the lidar sensor device, which is possibly permanent and not capable of being eliminated by a cleaning operation, may be reliably detected, so that a prompt, appropriate response is possible.

In accordance with an example embodiment of the present invention, this may be achieved by providing a cleaning device for a lidar sensor set-up, which is formed to have a movable cleaning element, and which is configured, for a cleaning operation, to move the cleaning element on and/or along an outer side of a window of the lidar sensor set-up; the outer side facing away from the lidar sensor set-up and facing the field of view of the lidar sensor set-up; the movable cleaning element including an optical element, and the optical element being configured to send back and, in particular, reflect back primary light from a transmitter circuit of the lidar sensor set-up, which is incident upon the optical element, into a receiving path of the lidar sensor set-up. Using these measures, continuous impairment, and/or impairment not eliminable by a cleaning operation, of the optical characteristics of the window, of the optical path, and/or of the light source, in particular, of a laser, of the lidar sensor set-up, may be deduced from a comparison of the intensity of the primary light sent back directly.

Preferred further refinements of the present invention are disclosed herein.

The optical element may be formed in various ways, as long as it is ensured that primary light of the lidar sensor device, which reaches the optical element from the transmitting path of the lidar sensor device, is sent back completely or partially into the receiving path of the lidar sensor device.

According to preferred specific embodiments of the cleaning device according to the present invention, the optical element takes the form of a(n), or is formed to include a(n)
 optically passive element;
 reflective element;
 mirror;
 Lambertian element or Lambertian scattering element;
 optically active element;
 optical waveguide; or
 a combination of them.

In this context, the movable cleaning element provided with the optical element may have completely different embodiments, as well, as long as it is ensured that it is suitable for a cleaning operation of the underlying window, and that in this case, it is moved on the outer side of the underlying window, facing away from the lidar sensor set-up.

According to other preferred, additional or alternative cleaning devices of the present invention, the movable cleaning element may be formed to include, or may take the form of, a wiper, in particular, including a wiper arm and wiper lip for contacting the outer side of the window, and/or a nozzle for issuing gas, air, and/or liquid.

It is particularly advantageous, when according to the present invention, primary light emitted in connection with the cleaning operation and the movement of the cleaning element is reflected directly in front of the outer side of the window by the optical element, and when the reflected light is also detected and evaluated accordingly.

Thus, in one embodiment of the cleaning device of the present invention, a control unit and/or an operative connection to a control unit is formed, in particular, with the aid of a control/detection line.

In one particularly preferred exemplary embodiment of the cleaning device according to the present invention, in particular, in cooperation with a detection unit of the basic lidar sensor set-up, the control unit is configured to evaluate detected primary light sent back by the optical element.

In particular, according to another further refinement of the cleaning device of the present invention, the control unit may be formed
 to determine the intensity of primary light sent back by the optical element;
 to compare it to a setpoint intensity;
 to compare it to an intensity from an immediately preceding, cleaning operation and/or movement action;
 to correlate a particular intensity with
  (i) a motion of the cleaning element;
  (ii) an angular motion of the cleaning element; and/or
  (iii) an angular position of the cleaning element;
 to compare it to a threshold intensity value for eye protection;
 to compare it to a setpoint laser power value of the intensity; and/or
 to output
  a control signal for a cleaning operation; and/or
  a warning signal,
 in particular, in each instance, in response to irremovable degradation, defect, and/or contamination.

According to a further aspect of the present invention, a lidar sensor set-up, as such, which is formed to include a cleaning device developed in accordance with the present invention, is also provided.

In this context, in accordance with an example embodiment of the present invention, the cleaning device is formed, in particular, as an additional element for a housing having a window, as well as transmitting and receiving units in the interior of the housing, which include a light source and detector, respectively, and whose interaction is controlled and/or regulated, in particular, with the aid of the control unit.

In addition, the present invention also provides a working device, which is formed to include a lidar sensor set-up developed according to the present invention, and which takes the form of, in particular, a vehicle.

BRIEF DESCRIPTION OF THE DRAWINGS

Specific embodiments of the present invention are described in detail below with reference to the figures.

FIGS. 5 and 8 show, in schematic and sectional side views, specific embodiments of the lidar sensor device according to the present invention, in coaxial form for the transmitting and receiving paths, utilizing specific embodiments of the proposed cleaning device that have differently designed optical elements.

DETAILED DESCRIPTION OF EXAMPLE EMBODIMENTS

Figure 1:
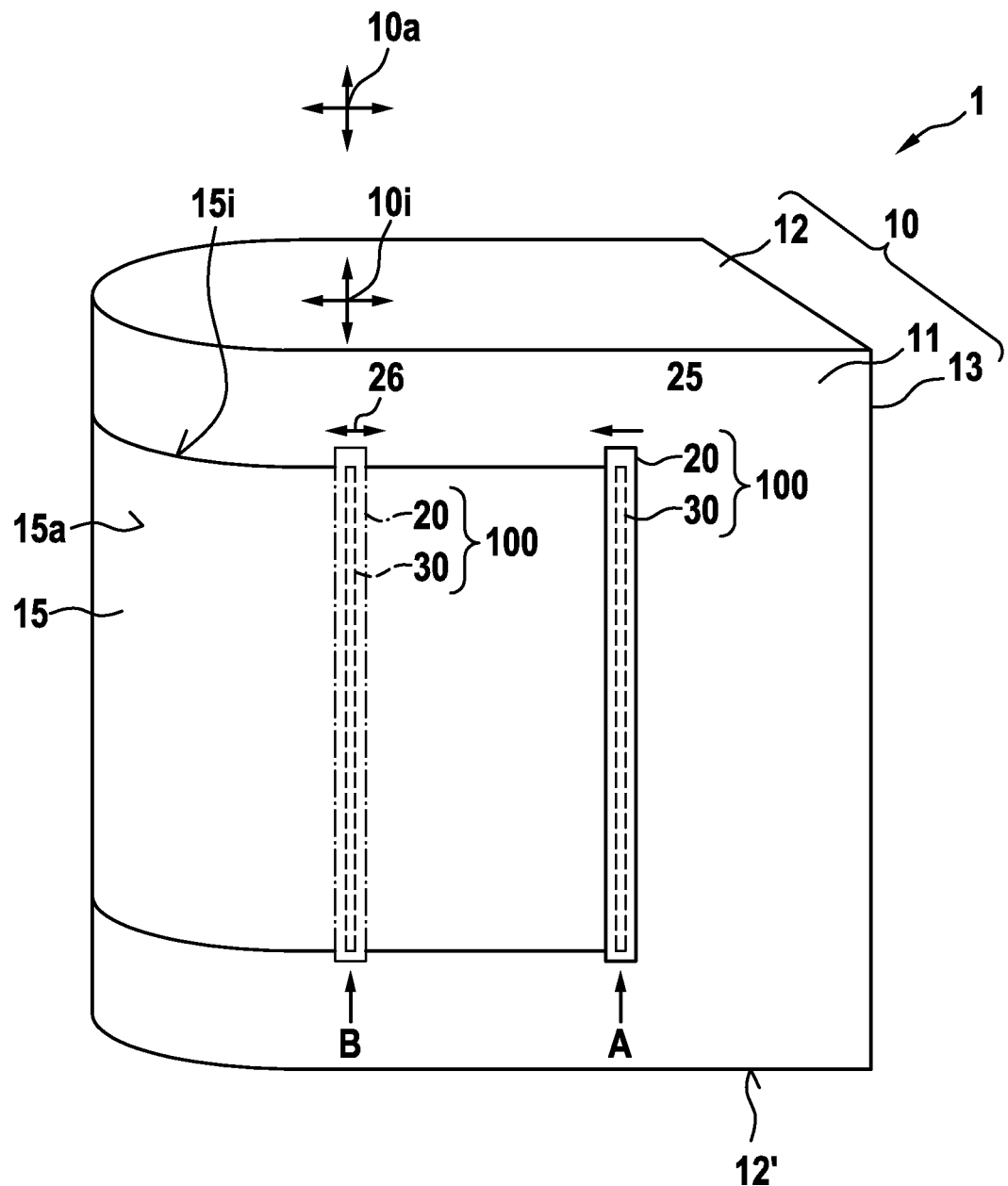
FIG. 1 shows a schematic and perspective view of a first general, specific embodiment of the lidar sensor device according to the present invention, where the cleaning device is formed to include an optical element.

In the following, exemplary embodiments of the present invention and the technical background are described in detail with reference to FIGS. 1 through 8. Identical and equivalent elements and components, as well as elements and components functioning in the same or in an equivalent manner, are denoted by the same reference numerals. The detailed description of the denoted elements and components is not repeated in each case of their appearance.

The depicted features and further characteristics may be isolated from each other and combined with each other, as desired, without departing from the essence of the present invention.

Initially, reference is made generally to FIG. 1 and the specific embodiments for the lidar sensor device 1 shown there.

FIG. 1 shows a schematic and perspective view of a first general specific embodiment of the lidar sensor device 1 according to the present invention, where a specific embodiment of the cleaning device 100 of the present invention is formed to include an optical element 30 on the moving or movable cleaning element 20 of cleaning device 100.

Substantial components of lidar sensor device 1 may be formed in the interior 10i of housing 10, that is, in particular, transmitter optics including a transmitter unit 41 and corresponding light sources for generating and/or emitting primary light 57 into associated field of view 50, and receiver optics 42, which include a receiver unit 42, and also a detector unit, for receiving and/or detecting secondary light 58 from field of view 50, or also, for example, in the form of primary light 57' sent back directly and, in particular, reflected back.

In this case, housing 10 itself is made up of, for example, a cover plate 12, a base plate 12', a back wall 13, and a housing element 11, in which a window 15 is formed; an inner side or inner surface 15i of the window facing interior 10i of housing 10, and an outer side or outer surface 15a of the window facing the exterior 10a of housing 10. The primary light 57 generated in interior 10i of housing 10 passes through the window set-up having window 15, from the inside to the outside, and possibly in the direction of field of view 50; and secondary light 58 from exterior 10a of housing 10 travels inwards, through the viewing set-up having the window, into the interior 10i of housing 10.

Window 15 has an outer side 15a, which is oriented towards or aligned with exterior 10a of housing 10, against which an inner side 15i of window 15 is oriented towards and aligned with interior 10i of housing 10.

A cleaning device 100 of the present invention is formed on outer side 15a of window 15. This includes a cleaning element 20, which may be moved by a motion mechanism in a controlled manner, from a position A in the direction of arrow 25. During the movement, cleaning element 20 is moved parallelly, locally parallelly, and/or in conformance with the surface of outer side 15a of window 15 and, in so doing, sweeps over or even contacts the surface of window 15 in highly close proximity to outer side 15a, if, for example, cleaning element 20 is formed as an arm or wiper arm 21 having a corresponding lip 22 for wiping contact with the surface of window 15.

Finally, cleaning element 20 may be moved in a controllable manner in the direction of double arrow 26, between the two end positions A, to a plurality or multitude of intermediate positions B between the end positions. During operation, the movement of cleaning element 20 is then preferably connected to a cleaning operation of outer side 15a of window 15.

To optically check the condition of window 15, cleaning element 20 includes an optical element 30, which is formed and configured in such a manner, that it sends back and, in particular, reflects back primary light 57 coming in from a transmitter path 51 of lidar sensor set-up 1 and, in particular, from interior 10i of housing 10, onto optical element 20, into a receiving path 52 of lidar sensor set-up 1 and, therefore, into interior 10i of housing 10 of lidar sensor set-up 1.

In this context, the event of sending-back or reflecting-back takes place in the region of exterior 10a of housing 10 and directly at outer side 15a of window 15. Consequently, primary light 57 is not attenuated at all in the region of exterior 10a of housing 10, which means that an optical condition of window 15 may be deduced from a comparison of the intensity of the primary light 57' to be reflected back directly, to an expected intensity.

As is shown, in particular, in further FIGS. 2 through 8, to that end, lidar sensor set-up 1 of the present invention includes a suitably formed control unit 40, which is operatively connected to transmitter unit 41, receiver unit 42, and also cleaning device 100, via a control and/or detection line 45. In this manner, these components may be controlled, as well as polled or interrogated with regard to their states, that is, in particular, appropriate light sources for emitting primary light 57, corresponding detector elements for detecting secondary light 58 and, in particular, the primary light 57' reflected back directly by optical element 30, and a drive unit for moving the moving or movable cleaning element 20 in a controlled manner.

Figure 2:
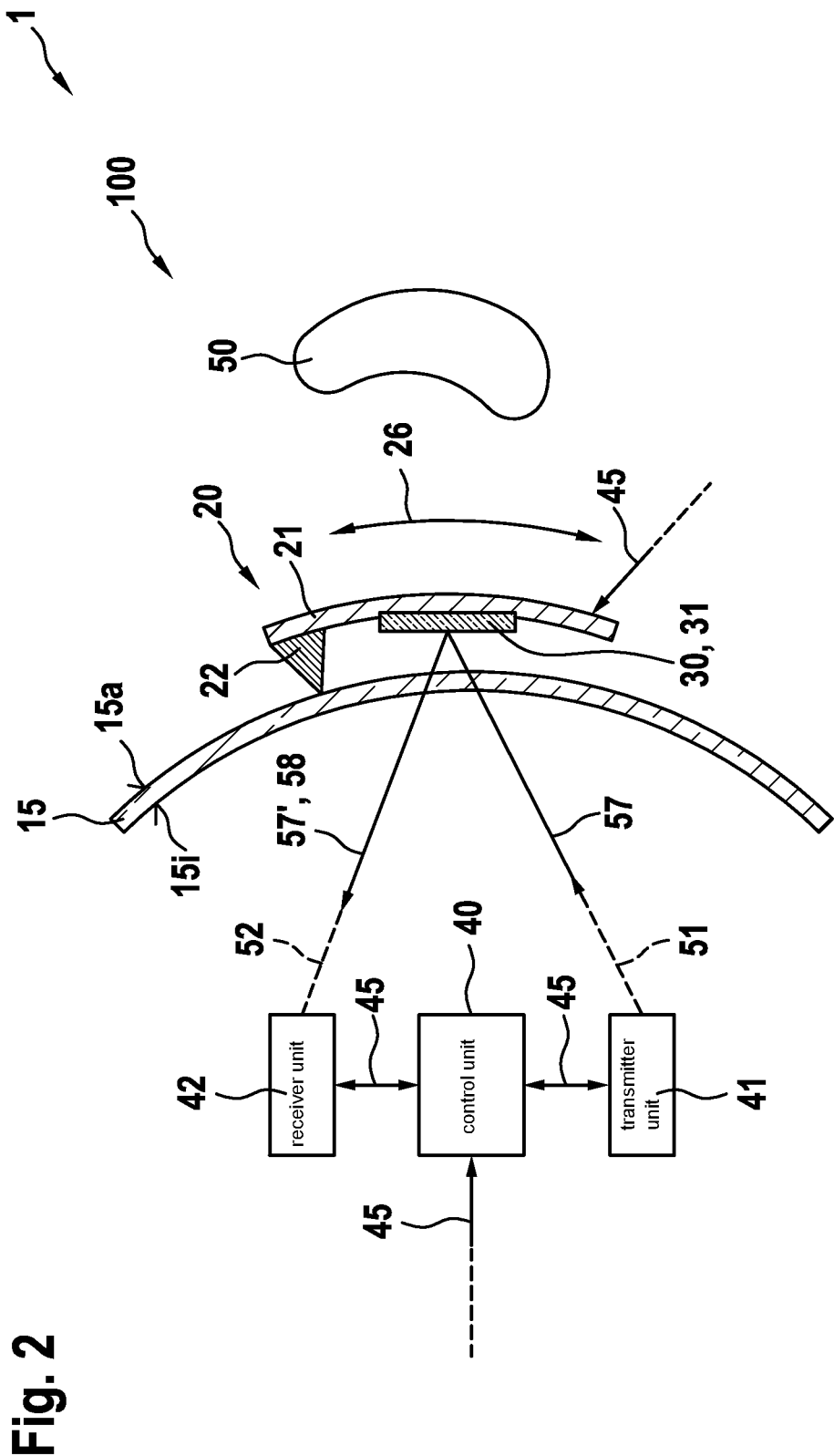
FIGS. 2 and 3 show, in schematic and sectional plan views, specific embodiments of the lidar sensor device of the present invention that utilize specific embodiments of the proposed cleaning device, which includes an optical element in biaxial and coaxial configurations, respectively, for the transmitting and receiving paths.
Figure 3:
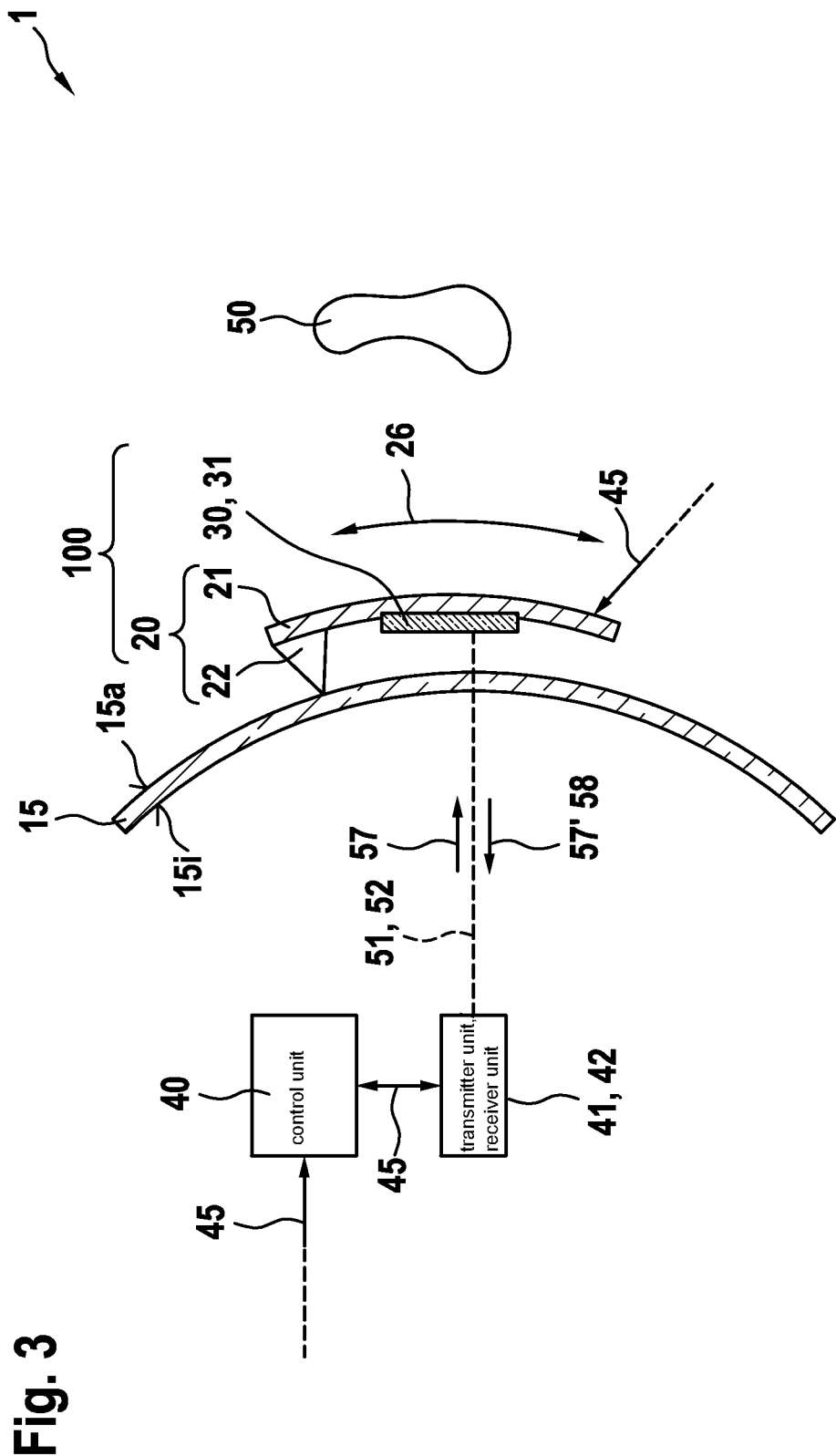

FIGS. 2 and 3 show, in schematic and sectional plan views, specific embodiments of the lidar sensor device 1 of the present invention that utilize specific embodiments of the proposed cleaning device 100, which respectively include an optical element 30 in biaxial and coaxial configurations for transmitting path 51 and receiving path 52. In this case, cleaning device 100 includes a wiper arm 21, which may be moved back and forth in a controllable manner in the direction of double arrow 26, with the aid of a drive unit, and which includes a lip or wiper lip 22 that sweeps over the surface of outer side 15a of window 15 in a contacting manner during the back-and-forth movement, in order to clean the window on outer side 15a in this manner.

Optical element 30, which takes the form of a reflecting element 31, e.g., a mirror, in the specific embodiments of FIGS. 2 and 3, is additionally formed on wiper arm 21.

Primary light 57 emitted by transmitter unit 41 leaves the interior 10i of housing 10 via transmitting path 51 and through inner side 50i and outer side 15a of window 15, strikes optical element 30 in the exterior 10a of housing 10, and there, it is reflected back directly, in order to travel, in the form of secondary light 58, namely, in the form of primary light 57' reflected back directly, through outer side 15a and inner side 15i of window 15, from exterior 10a into interior 10i of housing 10, consequently, via receiving path 52, into a detector in receiver unit 42, in order to be detected there. Corresponding detection signals are sent through control and/or detection line 45 to control unit 40 for evaluation, or are requested by it. Based on the evaluation, the further operation of transmitter unit 41, receiver unit 42, and/or cleaning device 100 may then be controlled and/or regulated, using the motion of cleaning element 20.

In the specific embodiment according to FIG. 2, transmitting path 51 and receiving path 52 and, therefore, transmitter unit 41 and receiver unit 42, are formed separately from each other. Thus, it is a biaxial system.

In contrast to that, the embodiment shown in FIG. 3 is a coaxial system. Transmitting path 51 and receiving path 52 coincide optically.

Figure 4:
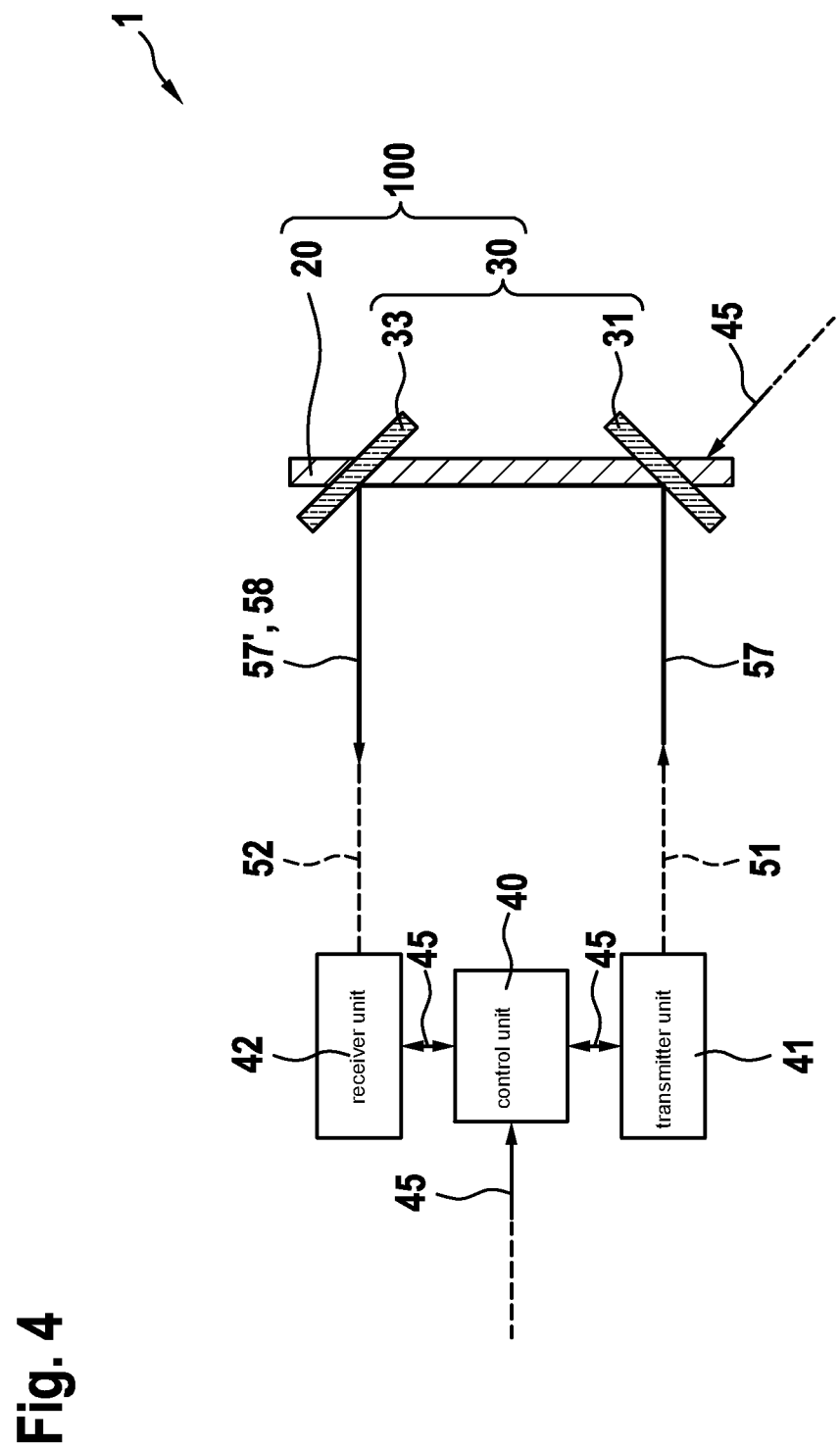
FIGS. 4 through 6 show, in schematic and sectional side views, specific embodiments of the lidar sensor device according to the present invention, in biaxial form for the transmitting and receiving paths, utilizing specific embodiments of the proposed cleaning device having differently designed optical elements.
Figure 5:
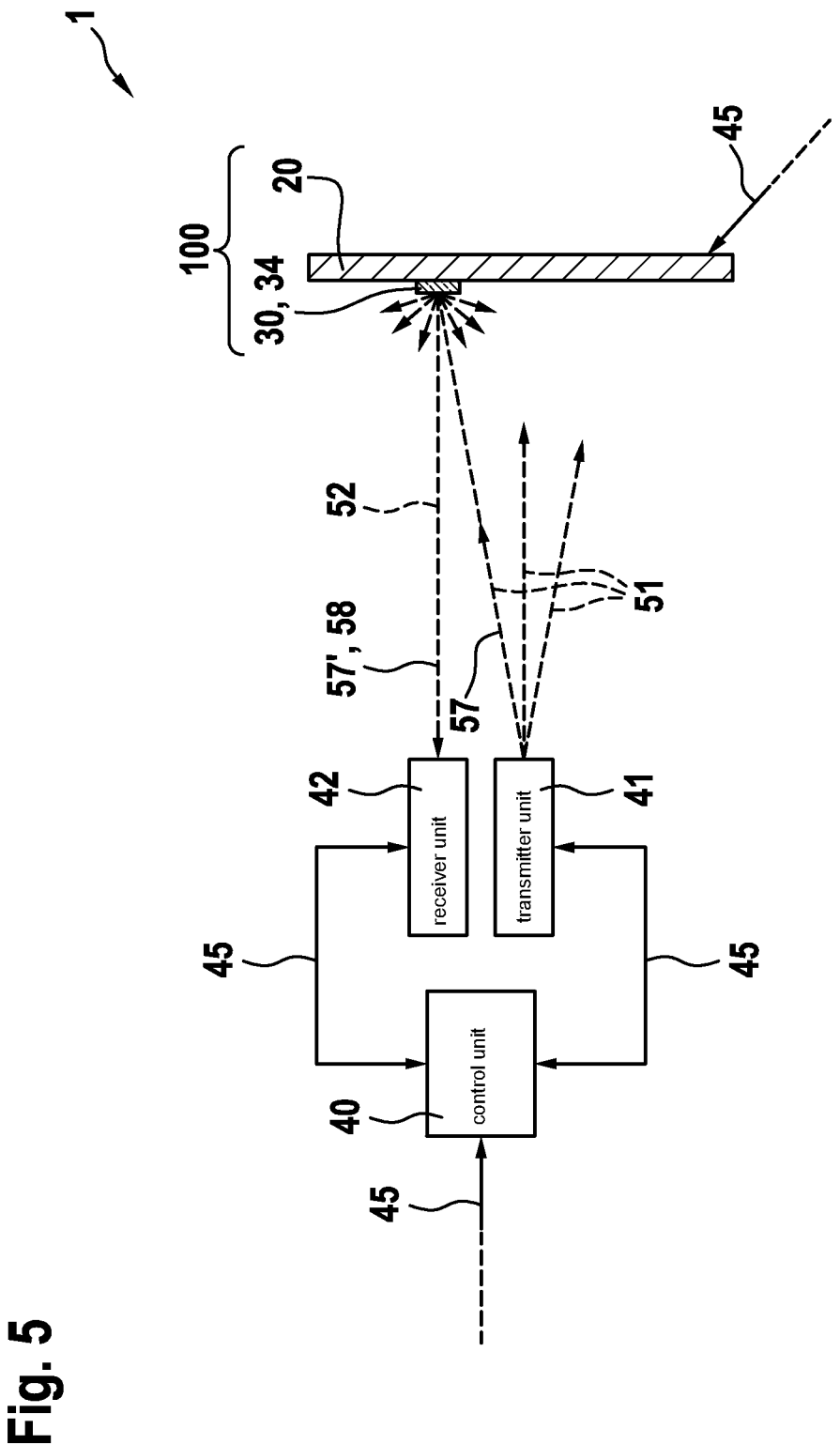
Figure 6:
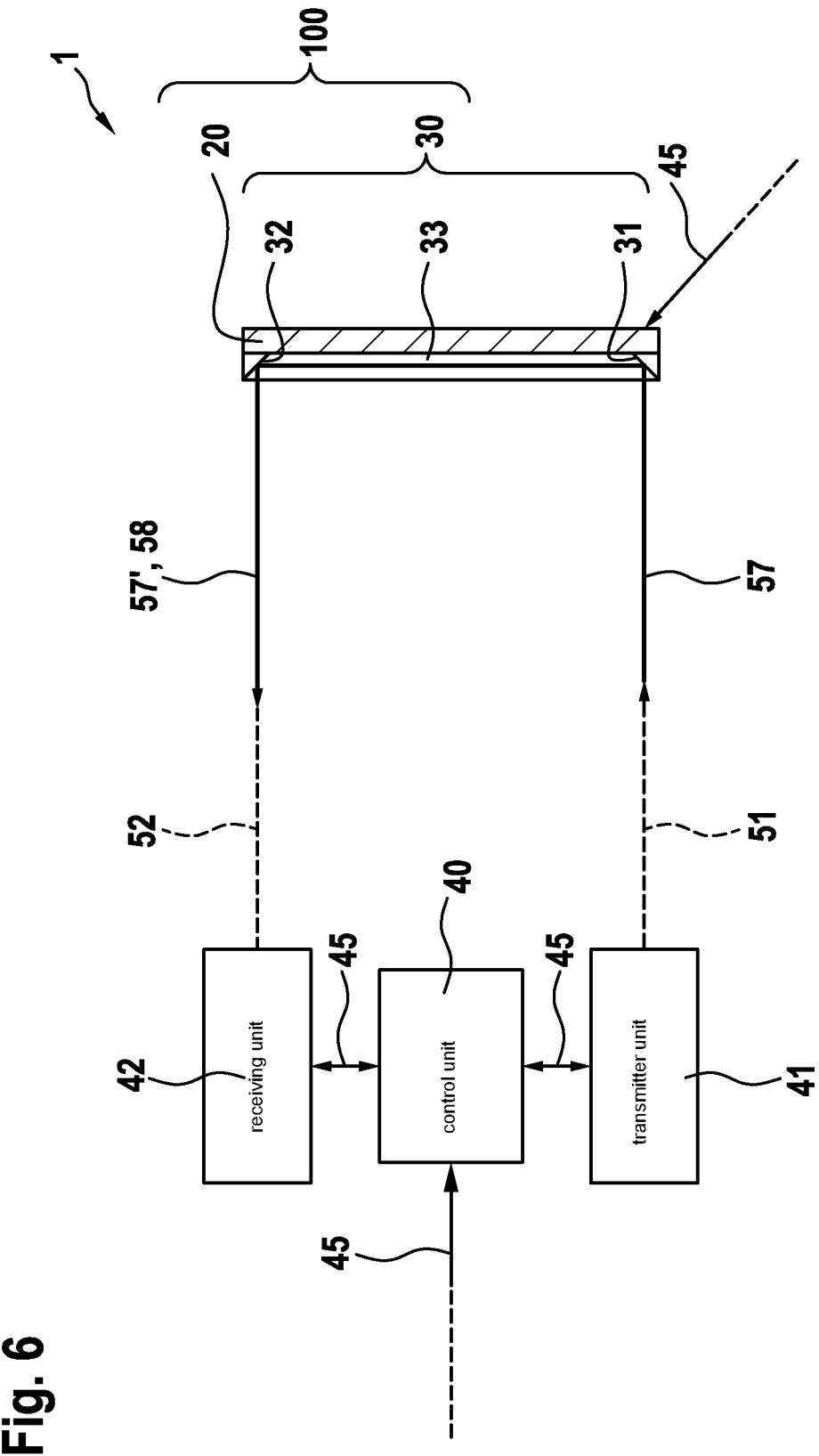

FIGS. 4 through 6 show, in schematic and sectional side views, specific embodiments of lidar sensor device 1 of the present invention, in biaxial form for transmitting path 51 and receiving path 52, utilizing specific embodiments of the proposed cleaning device 100 that have differently designed optical elements 20.

In the specific embodiment of FIG. 4, optical element 30 is formed by two mirrors 31 and 33, which are jointly used in interaction to deflect primary light 57 out of transmitting path 51 and consequently convert it to primary light 57' reflected back directly in the form of secondary light 58.

In the specific embodiment according to FIG. 5, optical element 30 is formed by a Lambertian element or scattering element. An advantage of this is that at least a portion of incident primary light 57 from transmitting path 51 is also scattered back in the direction of receiving path 52 in the form of secondary light 58, in order to be detected in receiver unit 42.

In the specific embodiment according to FIG. 6, optical element 30 is formed by a conductor 33, in which a first and a second mirror 31, 32 are formed to respectively couple in and ultimately couple out primary light 57 received from transmitting path 51.

Figure 7:
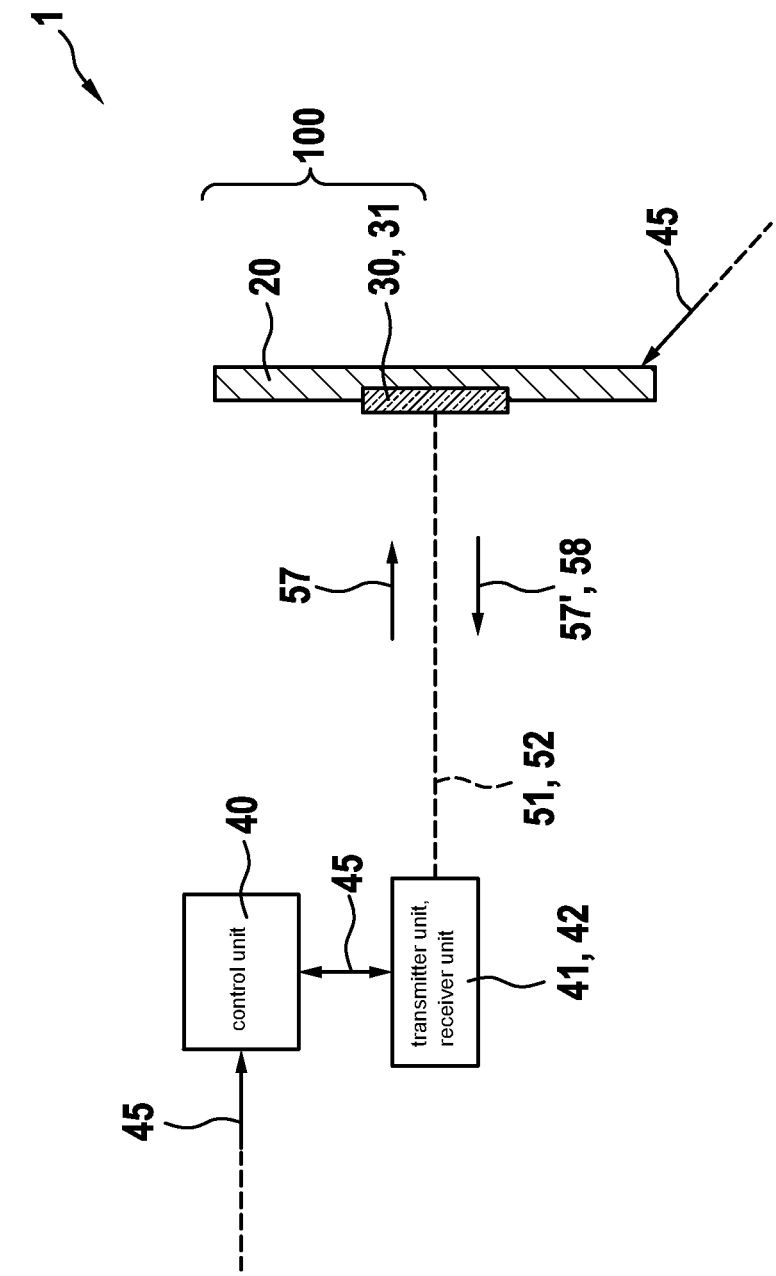
Figure 8:
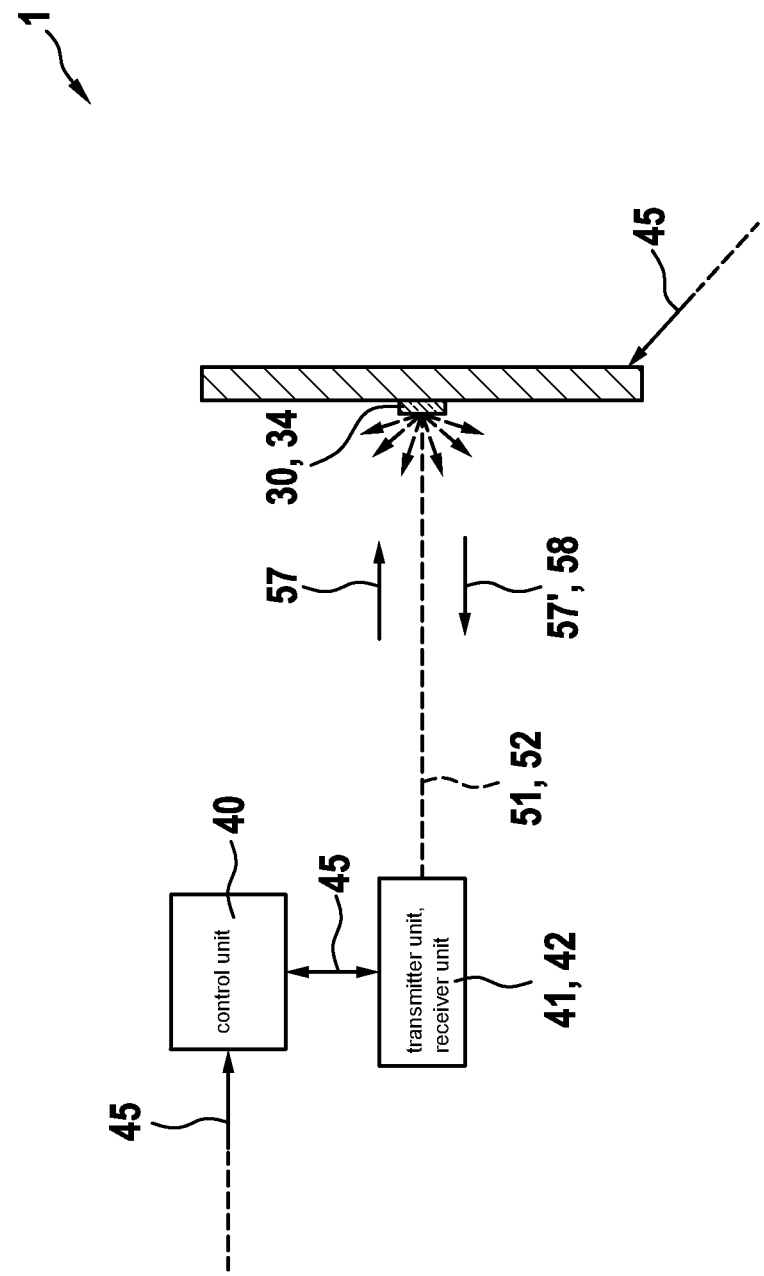

FIGS. 7 and 8 show, in schematic and sectional side views, specific embodiments of lidar sensor device 1 of the present invention in coaxial form for transmitting path 51 and receiving path 52, utilizing specific embodiments of the proposed cleaning device 100 that have differently designed optical elements 30, namely, again, in the form of a reflective element or mirror 31 and a Lambertian element 34, respectively.

These and additional features and characteristics of the present invention are elucidated further with the aid of the following explanations:

In the next few years, highly and fully automated vehicles (Level 3-5) will be found more and more on our roads. There are different concepts regarding how such an automated vehicle may be implemented. All of these approaches require many different sensors (such as video cameras, lidar, radar, and ultrasonic sensors); in particular, lidar sensors, optical sensors, which generate 3-D point clouds of the surrounding area with the aid of laser light, playing a more and more important role. This optical detection may easily be interfered with by contamination or water drops on the optical glass cover (also referred to as a blockade), which means that a cleaning of the glass is necessary in such cases. This cleaning is often accomplished with the aid of a wiper. For lidar sensor 1, the challenge is to detect the level of contamination and, through this, to initiate the cleaning interval automatically. At the same time, the intent is to limit the number of cleaning operations to a minimum, in order to maximize the service life of glass cover 15, since in the case of plastic covers 15, a cleaning operation may result in microscopically small scratches. The performance of lidar sensor 1 may be simultaneously affected by degradation of the glass cover material due to, for example, microscopically small scratches or discoloration. Lidar sensor 1 must detect such degradation automatically, in order to be able to communicate the current performance to a central evaluation unit.

In the case of a lidar sensor 1, one object of the present invention is, inter alia, to detect contamination, a blockade, and/or degradation of window 15 or glass cover 15 as simply and, nevertheless, reliably as possible, preferably, with the aid of a passive element.

In this context, a core aspect of a specific embodiment of the present invention is to form a reflecting element 30 on wiper 20 of a lidar sensor 1, which allows the degree of a blockade and/or degradation of window 15 to be deduced from the intensity of the laser light reflected by it.

The following advantages are yielded individually or in combination in the context of the present invention and its specific embodiments:
  passive method;
  no additional electronic components necessary;
  cost-effective; and
  high degree of validity of the generated data in comparison with indirect methods (point-cloud-based).

One specific embodiment of the present invention is made up of a lidar sensor 1 having a wiper as a cleaning device 100, as is shown in FIG. 1 in a general manner.

During the cleaning operation, wiper 20 travels over glass cover 10 of lidar sensor 1 and cleanses glass cover 10 of water drops and contamination. At the same time, a reflecting reference element 31 in the form of an optical element 30 is mounted on wiper arm 21. During the cleaning operation, the laser beam, in the form of primary light 57, is also aimed at reflecting element 31. The light 57' reflected by reflecting element 31 is measured in receiver 42 of lidar sensor 1. The transmission of glass cover 15 is determined from the measured light intensity, through which the degree of contamination or the degree of glass cover degradation may be deduced.

In particular, reflecting element 31 may be mounted on wiper arm 21 in such a manner, that with regard to specific moving direction 25, 26, reflecting element 31 is still moved over the glass 15, in front of wiper blade 22. In this manner, the degree of contamination may be measured before the contamination is removed. Subsequently, the cleaning interval may be reset in light of the measured degree of contamination. The direction of wiper 20 may then be reversed, so that it moves back into its starting position. In this instance, the transmission of glass cover 15 is redetermined. Since glass cover 15 is now already clean, changes in the transmission are now presumably attributable to glass cover degradation, for example, in the form of microscopic scratches, discoloration and the like.

In this case, sensor 1 may request a garage visit via control unit 40, using a warning signal or the like, or possibly call for a higher laser power in primary light 57, in order to compensate for the loss in transmission, as long as the laser power is still below the limit for eye safety.

Different technical implementations are possible as a function of the system architecture of lidar sensor 1 (coaxial, biaxial, macroscanner having a horizontal or vertical configuration, etc.).

A Lambertian scattering element 34 in the form of a diffuse scatterer, or one or more mirrors 31, 33 (FIGS. 2d and 2e), is effective for a coaxial system. For a biaxial system, reflecting element 20 must deflect light 57 from transmitting path 41 into receiving path 42 of lidar sensor 1. If transmitting path 41 and receiving path 42 intersect in the region of glass cover 15, then a Lambertian scattering element 34, as is shown in FIG. 5, is also sufficient in this case. If transmitting path 41 and receiving path 42 do not yet intersect in the region of glass cover 15, then this may be accomplished, for example, by an optical waveguide 32, or by reflecting mirrors 31, 33, as is shown in FIGS. 4 and 6.

Using the wiping across glass cover 15, one specific embodiment of the present invention also allows contamination and degradation to be localized in the horizontal direction (thus, one-dimensional localization). This may aid in understanding the solid angles, at which lidar sensor 1 possibly has a reduced operating range.

As an alternative to a wiper, the reflecting element may also be attached to other cleaning elements 20, which move across glass cover 10. For example, an arm having an air nozzle could be used for cleaning the glass cover.

The measured reflection may simultaneously be used for monitoring the laser power of the light source of transmitter unit 41, in order to ensure that lidar sensor 1 operates at a laser power safe for the eyes, and in order to detect possible ageing of the source or laser diode. In addition, possible incorrect adjustment or alignment error of the lidar sensor due to, for example, thermal effects or ageing of adhesive agents may be detected from the position and shape of the laser beam.

What is claimed is:

1. A cleaning device for a lidar sensor set-up, comprising:
a movable cleaning element;
wherein the cleaning device is configured, for a cleaning operation, to move the cleaning element on and/or along an outer side of a window of the lidar sensor set-up, the outer side of the window facing away from a lidar sensor device and facing a field of view of the lidar sensor set-up, and wherein the movable cleaning element has an optical element, the optical element being configured to reflect back primary light from a transmitting path of the lidar sensor set-up, which is incident upon the optical element, into a receiving path of the lidar sensor set-up,
wherein the lidar sensor includes a housing having a cover, a base, a back wall, and a housing element, in which a window is formed; an inner side or inner surface of the window facing an interior of the housing, and an outer side or outer surface of the window facing an exterior of the housing, wherein the primary light generated in an interior of the housing passes through a window set-up having a window, from inside to outside, and in a direction of a field of view, and wherein secondary light from the exterior of the housing travels inwards, through the viewing set-up having the window, into the interior of the housing,
wherein the outer side of the window is oriented towards or aligned with the exterior of the housing, against which the inner side of the window is oriented towards and aligned with the interior of the housing,
wherein the transmitting path and the receiving path of the lidar sensor set-up coincide optically, so that the transmitting path and the receiving path are coaxial, and
wherein the optical element is mounted on an inside face of a wiper arm which faces an outer side of the window, and wherein the optical element is below a wiper lip of the wiper arm, and includes one of the following:
an optically passive element;
a mirror or a plurality of mirrors;
a Lambertian element or a Lambertian scattering element in the form of a diffuse scatterer, or one or more mirrors;
an optically active element;
an optical waveguide.

2. The cleaning device as recited in claim 1, wherein the optical element includes the Lambertian element or the Lambertian scattering element in the form of a diffuse scatterer, or one or more mirrors, so that at least a portion of incident primary light from the transmitting path is scattered back in a direction of the receiving path as secondary light, so as to be detected in a receiver unit.

3. The cleaning device as recited in claim 1, wherein the movable cleaning element includes at least one of:
a wiper having the wiper arm and a wiping lip configured to contact the outer side of the window; and
a nozzle configured to issue gas, air and/or liquid.

4. The cleaning device as recited in claim 1, wherein the cleaning device includes an operative connection to a control unit using a control/detection line, and wherein, in cooperation with a detection unit of the lidar sensor set-up, the control unit is configured to evaluate detected primary light reflected back by the optical element.

5. The cleaning device as recited in claim 4, wherein the control unit is configured to perform at least one of the following:
determining an intensity of the primary light reflected back by the optical element;
comparing the intensity to a setpoint intensity;
comparing the intensity to an intensity from an immediately preceding, cleaning operation and/or movement action;

correlating the intensity with one of the following:
  (i) a motion of the cleaning element,
  (ii) an angular motion of the cleaning element, and
  (iii) an angular position of the cleaning element;
comparing the intensity to a threshold intensity value for eye protection; and
outputting a control signal for a cleaning operation, and/or a warning signal in each instance, in response to an irremovable degradation, a defect and/or a contamination.

6. A lidar sensor set-up, comprising:
a cleaning device including:
  a movable cleaning element,
    wherein the cleaning device is configured, for a cleaning operation, to move the cleaning element on and/or along an outer side of a window of the lidar sensor set-up, the outer side of the window facing away from a lidar sensor device and facing a field of view of the lidar sensor set-up, and wherein the movable cleaning element has an optical element, the optical element being configured to reflect back primary light from a transmitting path of the lidar sensor set-up, which is incident upon the optical element, into a receiving path of the lidar sensor set-up,
  wherein the lidar sensor includes a housing having a cover, a base, a back wall, and a housing element, in which a window is formed; an inner side or inner surface of the window facing an interior of the housing, and an outer side or outer surface of the window facing an exterior of the housing, wherein the primary light generated in an interior of the housing passes through a window set-up having a window, from inside to outside, and in a direction of a field of view, and wherein secondary light from the exterior of the housing travels inwards, through the viewing set-up having the window, into the interior of the housing,
  wherein the outer side of the window is oriented towards or aligned with the exterior of the housing, against which the inner side of the window is oriented towards and aligned with the interior of the housing,
  wherein the transmitting path and the receiving path of the lidar sensor set-up coincide optically, so that the transmitting path and the receiving path are coaxial, and
  wherein the optical element is mounted on an inside face of a wiper arm which faces an outer side of the window, and wherein the optical element is below a wiper lip of the wiper arm, and includes one of the following:
    an optically passive element;
    a mirror or a plurality of mirrors;
    a Lambertian element or a Lambertian scattering element in the form of a diffuse scatterer, or one or more mirrors;
    an optically active element;
    an optical waveguide.

7. A vehicle, comprising:
a lidar sensor set-up including a cleaning device, the cleaning device including:
a movable cleaning element,
wherein the cleaning device is configured, for a cleaning operation, to move the cleaning element on and/or along an outer side of a window of the lidar sensor set-up, the outer side of the window facing away from a lidar sensor device and facing a field of view of the lidar sensor set-up, and wherein the movable cleaning element has an optical element, the optical element being configured to reflect back primary light from a transmitting path of the lidar sensor set-up, which is incident upon the optical element, into a receiving path of the lidar sensor set-up,
wherein the lidar sensor includes a housing having a cover, a base, a back wall, and a housing element, in which a window is formed; an inner side or inner surface of the window facing an interior of the housing, and an outer side or outer surface of the window facing an exterior of the housing, wherein the primary light generated in an interior of the housing passes through a window set-up having a window, from inside to outside, and in a direction of a field of view, and wherein secondary light from the exterior of the housing travels inwards, through the viewing set-up having the window, into the interior of the housing,
wherein the outer side of the window is oriented towards or aligned with the exterior of the housing, against which the inner side of the window is oriented towards and aligned with the interior of the housing,
wherein the transmitting path and the receiving path of the lidar sensor set-up coincide optically, so that the transmitting path and the receiving path are coaxial, and
wherein the optical element is mounted on an inside face of a wiper arm which faces an outer side of the window, and wherein the optical element is below a wiper lip of the wiper arm, and includes one of the following:
  an optically passive element;
  a mirror or a plurality of mirrors;
  a Lambertian element or a Lambertian scattering element in the form of a diffuse scatterer, or one or more mirrors;
  an optically active element;
  an optical waveguide.

* * * * *